United States Patent
Howard

[15] 3,701,152
[45] Oct. 24, 1972

[54] BIPOLAR SAMPLE AND HOLD CIRCUIT

[72] Inventor: Harold K. Howard, Arroyo Grande, Calif.

[73] Assignee: The United States of America as represented by the Secretary of the Navy

[22] Filed: July 20, 1970

[21] Appl. No.: 56,562

[52] U.S. Cl. ............................................. 343/16 M
[51] Int. Cl. ........................... G01s 9/02, G01s 9/22
[58] Field of Search .................................. 343/16 M

[56] References Cited

UNITED STATES PATENTS

| | | | |
|---|---|---|---|
| 3,365,715 | 1/1968 | Stoney | 343/16 M X |
| 3,249,934 | 5/1966 | Hague | 343/16 M X |
| 3,390,390 | 6/1968 | Vehrs, Jr. | 343/16 M |

Primary Examiner—Malcolm F. Hubler
Attorney—R. S. Sciascia and Thomas O. Watson, Jr.

[57] ABSTRACT

A bipolar sample and hold circuit which samples raw video signal returns from a radar, integrates the energy of the signal during that sample and holds the integrated sample long enough for an analog to digital (A/D) converter to convert the signal energy to a digital number.

7 Claims, 7 Drawing Figures

INVENTOR.
HAROLD K. HOWARD
BY Thomas O. Watson Jr.
ATTORNEY

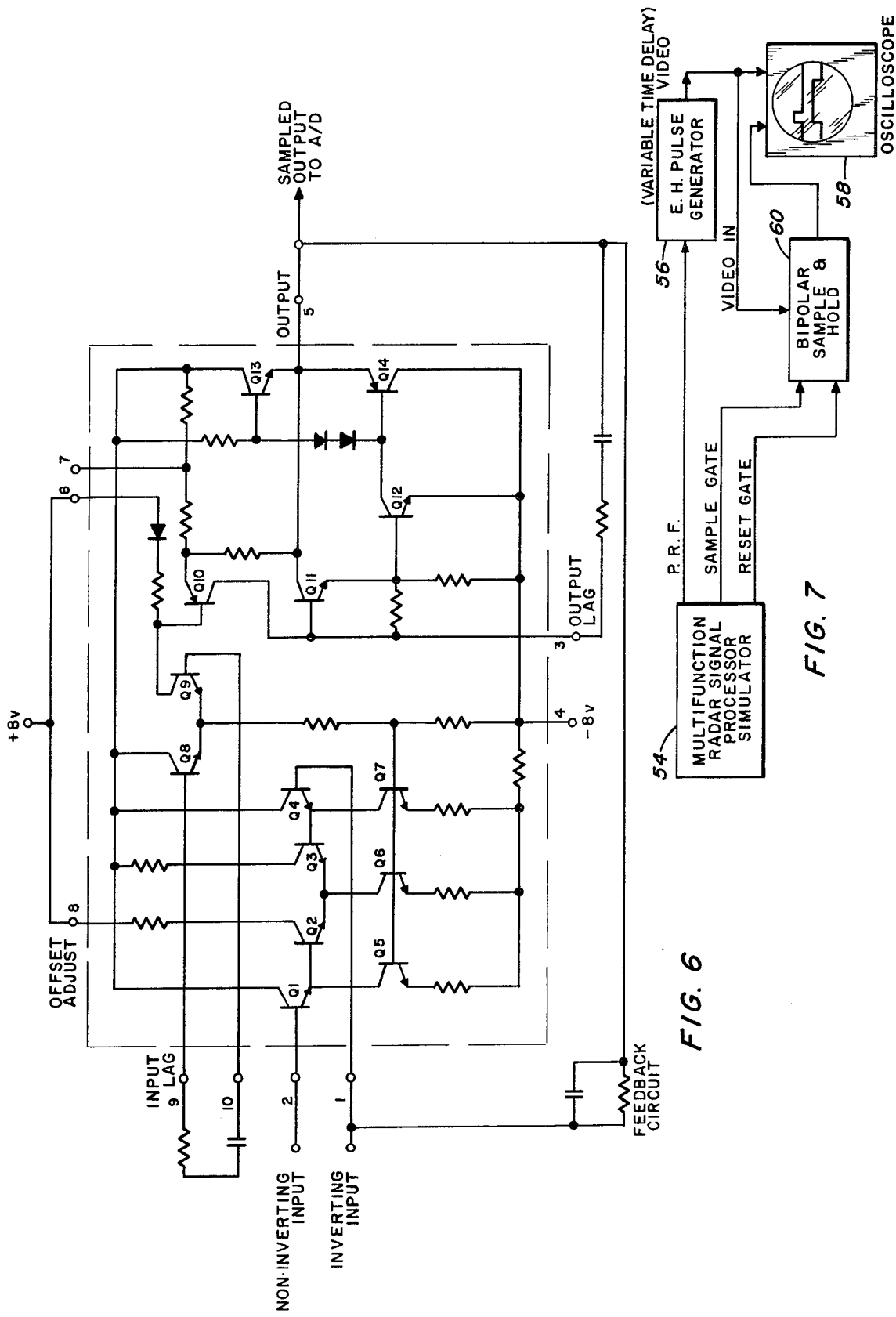

3,701,152

BIPOLAR SAMPLE AND HOLD CIRCUIT

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

Prior art sample and hold circuits whereby a short term video pulse is stretched to provide a useable output, were generally used to derive range and angle target tracking information. However, these circuits had a number of disadvantages and shortcomings in that they were not bipolar in operation, and had a very limited frequency response.

SUMMARY OF THE INVENTION

The present invention provides considerable improvement over the similar prior art devices since it is bipolar in operation, has a high frequency response, and is relatively low in cost.

The eight channel bipolar sample and hold circuit, such as one shown in the present invention, is one of the major components of the multifunction radar signal processor (MRSP). Its functions are to sample the raw video signal returns from a monopulse radar, to integrate the energy of the signal during that sample, and to hold the integrated sample long enough for the analog to digital converter (A/D) to convert the signal energy to a digital number. Each of the eight channels has its own bipolar sample and hold circuit, and all eight outputs are fed into the A/D where they are multiplexed, sampled, and converted one at a time. The digital outputs are transferred to the MRSP arithmetic unit which derives range and angle target tracking information.

The incoming video signal from the monopulse receiver is separated by the signal processor into six channels of detected sum video and two channels of difference video error, one azimuth and one elevation. The six channels of sum video are samples of the video return taken at six successive sample periods determined by the timing section of the MRSP.

OBJECTS OF THE INVENTION

An object of the present invention is the provision of a bipolar sample and hold circuit.

Another object of the present invention is the provision of a bipolar sample and hold circuit which samples the video signal returns from a monopulse radar.

Still another object of the present invention is the provision of a bipolar sample and hold circuit which integrates the energy of the signal during that sample.

Yet another object of the present invention is the provision of a bipolar sample and hold circuit which holds the integrated sample long enough for the analog to digital converter to convert the signal energy to a digital number.

Still another of the present invention is the provision of a bipolar sample and hold circuit which takes samples of radar returns and derives from these samples range and angle target tracking information.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

BRIEF DESCRIPTION OF THE DRAWINGS

FIG. 6 shows a schematic circuit for an operational amplifier.

FIG. 7 shows a block diagram of a multifunction radar signal processor gate and PRF simulator test setup.

DETAILED DESCRIPTION OF THE PREFERRED EMBODIMENT

Figure 1:
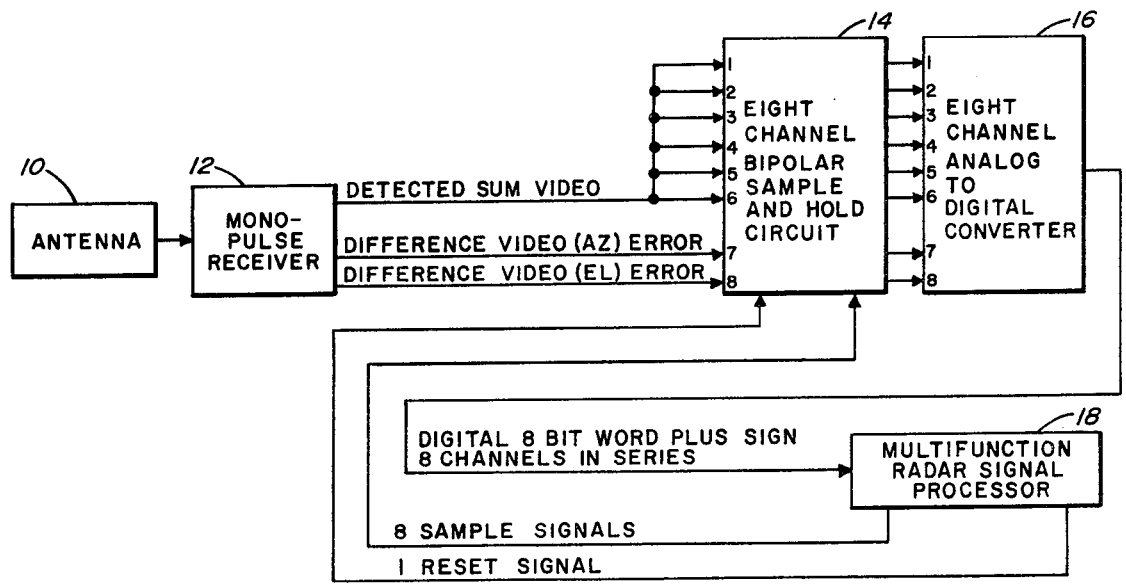
FIG. 1 shows a block diagram of a multifunction radar signal processing system.
Figure 2:
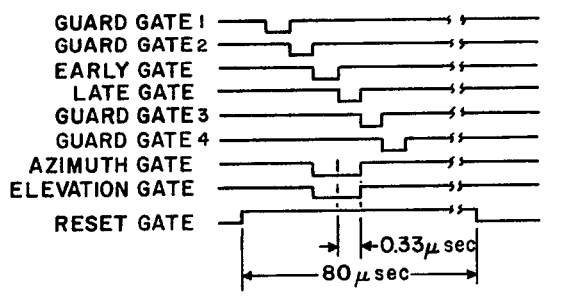
FIG. 2 shows the input signals from the multifunction radar signal processor and the output forms to the analog to digital converter.
Figure 2:
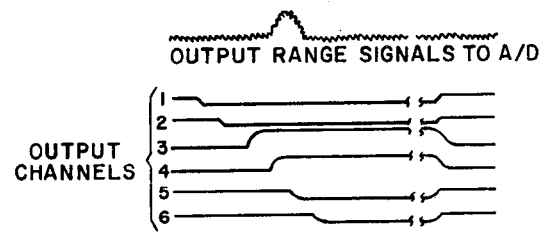

Referring now to FIG. 1 there is shown a block diagram of a multifunction radar signal processing system in which video signals are received by an antenna 10 and applied to a monopulse radar receiver 12 in which these video signals are separated into six detected sum video signals a difference video error signal for azimuth, and a difference video error signal for elevation. These eight video signals are applied to an eight channel bipolar sample and hold circuit 14, the delayed signals are then applied as input to an eight channel analog to digital converter 16 where the signals are converted into digital numbers, the output of converter 16 being in the form of a digital eight bit word, all eight channels being in series before it is applied as an input to the multifunction radar signal processor (MRSP). The output of the MRSP, in the form of eight sample signals and one reset signal, is applied as further input to the bipolar sample and hold circuit 14. FIG. 2 shows the sample waveforms as received from the MRSP by the bipolar sample and hold circuit 14, and also the output signals from this circuit to the analog to digital converter.

Figure 3:
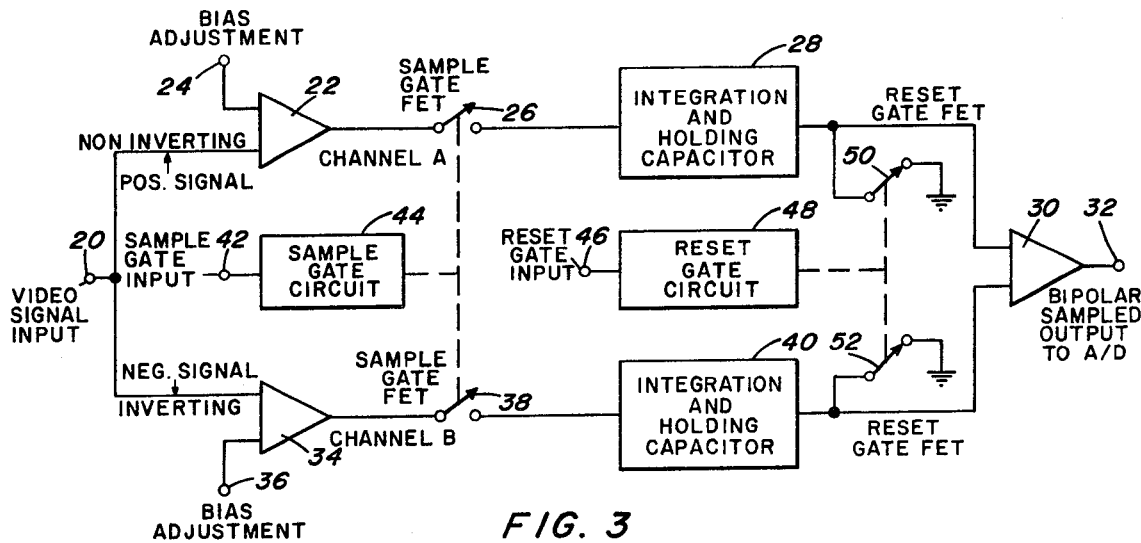
FIG. 3 shows a block diagram of the bipolar sample and hold circuit.

The block diagram of FIG. 3 shows a sample bipolar and hold circuit and it should be noted that each of the eight channels of input video signals is handled by a separate sample and hold circuit such as the one shown in FIG. 3. The circuits are identical and are capable of handling either positive or negative signals although in service six of them will see only positive signals. The signal is applied to an input terminal 20 where it is divided into two channels such as channel A and channel B. Channel A which handles the positive signals is thus non-inverting and the signal is applied to a differential amplifier and integrating circuit 22 whose bias adjustment is obtained from an input terminal 24, and whose output is applied to a sample gate FET (field effect transistor) 26. When FET 26 is closed the signal will be applied to an integration and holding capacitor circuit 28 and thence to an operational amplifier 30 which is connected to an output terminal 32. Channel B is similar to channel A except that it receives negative signals which are inverted to be applied as a positive signal to the differential amplifier and integrating circuit 34, with bias adjustment terminal 36, and whose output is applied to FET gate 38. When FET gate 38 is closed a signal is applied to an integration and holding capacitor circuit 40 before being applied as a second input to operational amplifier 30. A sample gate input signal which is applied to terminal 42 activates sample gate circuit 44 to simultaneously close FET 26 and 38 which are tied together. Likewise a reset gate input applied to terminal 46 activates reset gate circuit 48 to simultaneously activate reset gate FET 50 and 52. The signal as supplied by the output terminal 32 is now in the form of a bipolar sample output and is applied to the analog to digital converter (not shown).

Figure 4:
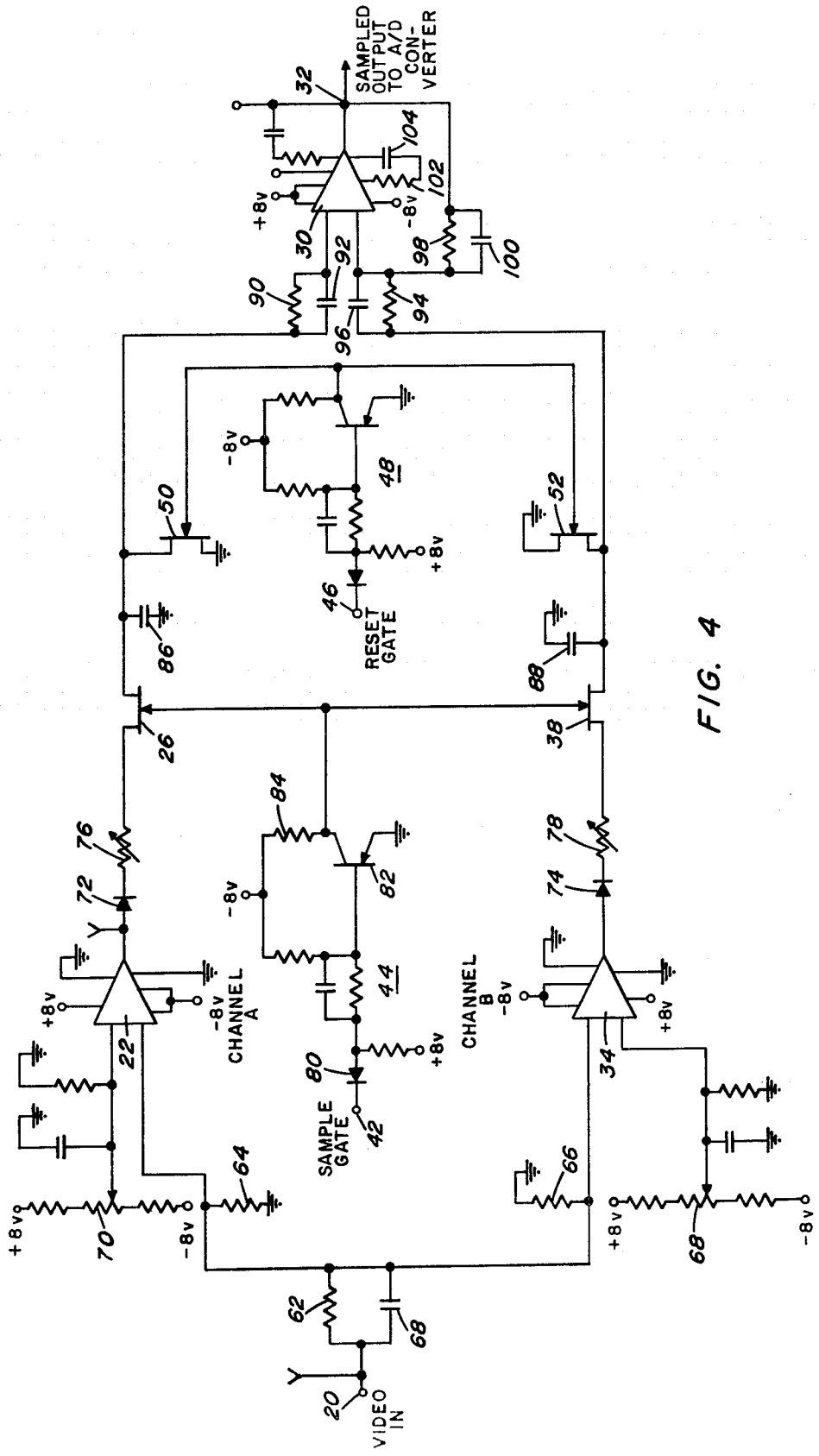
FIG. 4 shows the schematic circuit and waveforms as used in a bipolar sample and hold circuit.

The schematic diagram of FIG. 4 shows in circuit detail the various components shown in the block diagrams of FIG. 3 and for the sake of simplicity each of these components will not be described again. The differential amplifier and integrating circuits shown in FIG. 3 as 22, and 34 are shown in schematic detail in FIG. 5 and while these components are similar to those well known in the art, they may be an RCA-CA3001 component, for example. Likewise the operational amplifier 30 of FIG. 3 is shown in minute detail in FIG. 6 and a typical component used for this purpose may be a Motorola MC1533 component.

A typical multifunction radar signal process or gate and PRF simulator test setup is shown in FIG. 7 wherein the MRSP simulator 54 supplies a PRF signal to an EH pulse generator 56 which is a varible time delay video. The output of generator 56 is then applied to an oscilloscope 58 and also to a bipolar sample and hold circuit 60. The MRST 54 also furnishes sample gate signals and reset gate signals as outputs which are also applied to bipolar sample and hold circuit 60.

In reciting the operation of the device, the general overall operation will be described first and then the more specific operation will be given in detail later. Each of the eight channels of input video signal is handled by a separate sample and hold circuit. The circuits are identical and are capable of handling either positive or negative signals, although in service six of them will see only positive signals. While a single bipolar unit for all eight channels is possible, its advantages are outweighed by the problems of cost involved in design, fabrication, and storage of two separate circuits. FIG. 3 is a block diagram of one sample and hold circuit.

Since the field effect transistors (FETS) switch positive (above ground) signals only, all incoming negative video signals are inverted. Negative signals are inverted in the differential amplifier and integration circuits 22 and 34 and reinverted by the operational amplifier 30 before they go to the analog to digital converter. The inverting and noninverting portions of the circuit, channels A and B of FIG. 3, are similar except for the output connections from integrated circuits 22 and 34 and the input connections to the operational amplifier 30.

The input video signal passes the voltage divider and is fed to the integrating circuits 22 and 34 where it is amplified. The integrating circuit output is fed to the integrating and holding capacitors 28 and 40 through a sample gate FET 26 and 38. When the sample gate signal is received from the MRSP, the sample gate circuit 44 applies a signal to the FETs 26 and 38 causing them to conduct. The normally open sample gate FETs are shown as electrically operated switches since that is analogous to their function in the circuit. Immediately prior to the time the sample gate FETs 26 and 38 begin to conduct, the reset circuit 48 opens the reset gate FETs 50 and 52. While a voltage level proportional to the signal energy level is being held on the storage capacitor it is also being impressed on operational amplifier 30, the amplifier's output being available for the analog to digital conversion. At the end of the holding time, a reset signal is received by the reset gate FETs which conduct the drain off the energy remaining in the capacitors. The capacitors are held discharged until immediately prior to the next sample gate signal.

For a detailed operation of the bipolar sample and hold circuit let us refer now back to FIG. 4. The incoming video signal passes through the input terminal 20 and through the voltage divider comprised of resistance 62 and parallel resistances 64 and 66, which limits the input voltage to approximately 640 millivolts, which is the maximum practical input voltage for the differential amplifier and integrated circuits 22 and 34. Capacitance 68 speeds up the high frequency portion of the signal and helps maintain the wave shape. The circuit is divided into two almost symmetrical paths, channel A and channel B, labeled inverting and noninverting respectively on FIG. 4. The only differences between the two paths are the output connections from the differential amplifier as 22 and 34, the input connections to the operational amplifier 30, and the different bias adjustments to the differential amplifiers as at terminals 24 and 36 for the positive and negative signals. The two gate circuits, sample gate 44 and reset gate 48 respectively and the operational amplifier 30 are shared by both paths. The bias adjustments of the differential amplifiers 22 and 34 determine which of these amplifiers passes the positive signal and which one passes the negative signal.

Figure 5:
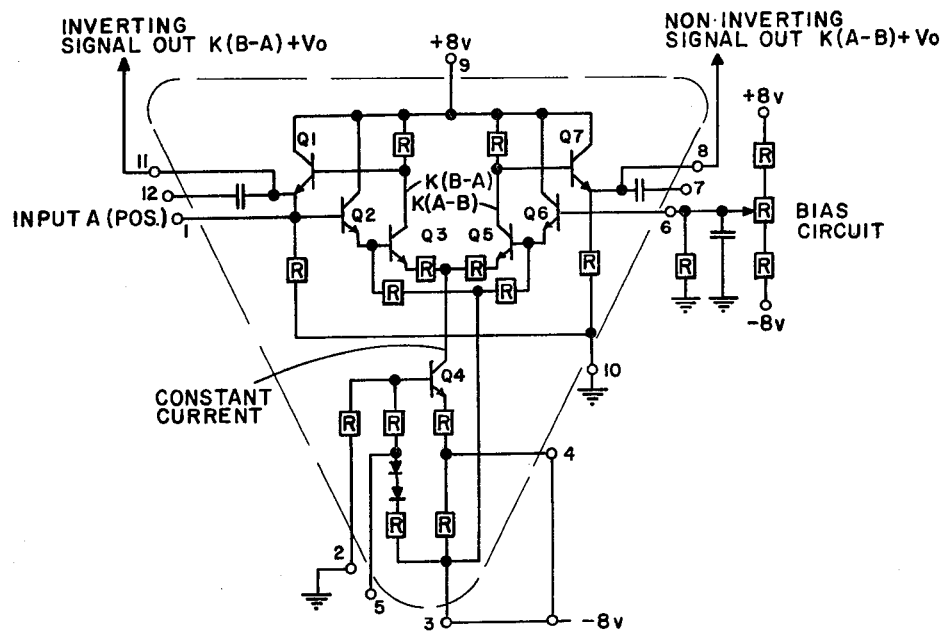
FIG. 5 shows the schematic for differential amplifier and integrated circuit.

The incoming video signal enters the differential amplifiers 22 and 34 through pin 1, the positive input. FIG. 5 presents a schematic of the integrated circuit forming a portion of differential amplifiers 22 and 34, and its external connections to the sample and hold circuit. An incoming signal is amplified in the Darlington configuration of transistors Q2 and Q3 of the integrating circuit. The amplified signal on the collector of Q3 is applied to outputs 10 and 11 through the emitter follower transistor Q1 for negative signals. The bias maintained by the external adjustable resistor 68 is supplied to transistor Q6 and is maintained at a high enough negative voltage that the output of the emitter follower transistor Q1 remains near 0 volts when there is no input signal.

An incoming positive signal passes through the Darlington configuration and is impressed on Q5 by driving the emitters of Q3 and Q5 positive. The amplified output from the collector of Q5 is sent to Q7 and then leaves the integrated circuit by pin 8. A positive bias is established with the adjustable resistor 70 and is supplied to transistor Q6 to maintain a near 0 volts output from transistor Q7 with no input video signal.

The output from the integrated circuit 22 or 34 passes through diode 72 for positive signals or 74 for negative signals, which is required to help keep the charge being stored on the capacitor from leaking back during the hold period. The field effect transistors, 26 and 28, have some high resistance when turned off that might otherwise allow some charge to leak off the capacitors. After passing diode 72 and 74 the video signal is fed to adjustable resistors 76 and 78 respectively which adjust the charging rate of the capacitors.

The signal is conducted through the Fets 26 and 38 when in the conducting mode during the sample time period. The FETs function as electronically controlled switches, controlled by the sample gate circuit 44 which is activated by an input signal applied to sample gate input 42.

The switching of the FETs is controlled by the sample gate circuit 44 which appears in the center of FIGS. 3 and 4. A separate signal comes from the MRSP timing section through the diode 80 which acts as a limiter in this circuit. The steady state condition is 4 volts and the signal is a 0 volt pulse (FIG. 2). When the input is at 4 volts, the base of the switching transistor 82 is at 1 volt and the transistor is turned off. This allows approximately minus 8 volts to be supplied to the gate of the FETs to keep FETs 26 and 38 turned off. When the sample gate input signal goes to 0 volts it causes the base voltage to go to minus 2 volts, which turns it on, causing the collector voltage to rise to approximately 0 volts. Resistor 84, the collector load resistor, helps transistor 82 to maintain near 0 volts from the collector to the gates of the FETs. With 0 volts at the gates, the FETs 26 and 38 conduct and the incoming positive video signal is integrated by R76 and capacitor 86, and held for the required time on capacitor 86. The incoming negative video signals are integrated by resistance 78 and capacitor 88.

A reset signal from the MRSP timing section is processed by the reset gate circuit 48 which is similar to the sample gate circuit 44 described above, except for the component identification numbers and the inputs and outputs of the circuit. The output signal is fed to the reset FETs 50 and 52 which discharge the voltage on the capacitor to ground to reset the circuit for the next input pulse.

The positive video signal passes through the summing resistor 90 and speed up capacitor 92 and into operational amplifier 30 through pin number 2. Negative video signals pass through the summing resistor 94 and speed capacitor 96 and into operational amplifier 30 through pin number 1. A feed back circuit, containing resistor 98 and capacitor 100 is used for output stability, while resistor 102 and capacitor 104 represent a frequency compensation circuit. Amplifier 30 is a monolithic, operational, differential amplifier with high input impedance and low output impendance, while FIG. 6 shows a detailed schematic of the internal structure of this component. The noninverted positive video signals are passed right through, while the negative video signals are reinverted in the differential amplifier 30 to a negative output as produced on terminal 32. Only one of the two paths channel A or channel B will conduct a signal at any one time, since the input will be either positive or negative.

The majority of the components that are to be assembled onto the sample and hold circuit board are standard commercial items, all resistors being ¼ watt except for the adjustable resistors which are ½ watt. Because of the design of the circuit board and the slight differences in physical dimensions which cause large variations in the inherent capacitance and the inductance of different boards, the values of certain items are critical and must be matched to each other and to the particular board. These critical items are the three capacitors in the circuitry surrounding the operational amplifier 30, and instead of having a discrete value there is the requirement that this value must be determined on assembly.

After the rest of the components have been installed, a capacitor with a value of approximately 160 PF should be installed in the 92 and 96 positions, and one of approximately 82 PF in the 100 position. The circuit board should be connected to the MRSP similator as shown in FIG. 7. The pulse generator should be adjusted to put out a 1 volt pulse at the PRE of the sample gate and should be wide enough to fill the sample gate. The proper values of the capacitors can be chosen by the following procedures:

a. With a 1 volt signal input check the output square wave on the oscilloscope 58 for tilt. Tilt should be less than 20 millivolts for a holding time of 80 microseconds. If it is not, change the value of capacitance 100 until the tilt is less than 20 millivolts.
  b. Switch the input signal to minus one volt and check the output wave for tilt. The tilt should be less than 20 millivolts. If the tilt is greater than 20 millivolts, change capacitor 96 until the tilt is less than 20 millivolts.
  c. Check the output signal for tilt with a plus 1 volt input signal. If the tilt exceeds 20 millivolts change the value of all three capacitances and begin again with step A.

From the above description of the structure and operation of the invention it is clear that the device disclosed offers many improvements over the prior art circuits. The device functions to sample raw video signal returns from a monopulse radar, integrates the energy of these signals during that sample, and holds the integrated sample long enough for the analog to digital converter to convert the signal energy to a digital number. The digital outputs are transferred to an MRSP arithmetic unit which derives range and angle tracking information.

Obviously many modifications and variations of the present invention are possible in the light of the above teachings. It is therefore to be understood, that within the scope of the appended claims the invention may be practiced otherwise than as specifically described.

What is claimed is:

1. A bipolar sample and hold circuit comprising:
means for receiving video signals from a monopulse radar, said means comprising only one terminal:
first and second signal processing channels connected to the receiving means, wherein said first channel comprises:
differential amplifier means connected to said one terminal for amplifying and integrating only positive input signals;

a first integrating and holding capacitor for receiving the integrated positive signal; and, a first sampling switch connected between said positive signal amplifying means and said first capacitor; and, said second channel comprises:

differential amplifier means connected to said one terminal for amplifying and integrating only negative input signals and for inverting the signals;

a second integrating and holding capacitor for receiving the integrated and inverted negative signal; and a second sampling switch connected between said negative signal amplifying means and said second capacitor;

operational amplifier means connected to said first and second capacitors for amplifying the signal on said first capacitor and for amplifying and inverting the signal on said second capacitor; and, means for providing an output from the operational amplifier means.

2. The device of claim 1 wherein said first channel includes a first reset switch connected across said first capacitor, and said second channel includes a second reset switch connected across said second capacitor.

3. The device of claim 2 wherein the first and second sampling switches in the first and second signal processing channels are field effect transistors.

4. The device of claim 3 wherein the first and second reset switches in the first and second signal processing channels are field effect transistors.

5. The device of claim 4 further including a sampling switch control circuit integrally connected to the sampling switches in both the first and second signal processing channels, for simultaneously operating the sampling switches in both channels.

6. The device of claim 5 further including a reset switch control circuit integrally connected to the reset switches in both the first and second signal processing channels for simultaneously operating the reset switches in both channels.

7. The device of claim 6 wherein the output means of the operational amplifier means provides a bipolar sampled output pulse which has been held a predetermined length of time.

* * * * *